United States Patent
Cho et al.

(10) Patent No.: US 10,611,231 B2
(45) Date of Patent: *Apr. 7, 2020

(54) POWER TRANSMISSION SYSTEM OF VEHICLE

(71) Applicants: Hyundai Motor Company, Seoul (KR); Kia Motors Corporation, Seoul (KR)

(72) Inventors: Wonmin Cho, Hwaseong-si (KR); Seong Wook Hwang, Gunpo-si (KR); Woochurl Son, Seongnam-si (KR); Hyun Sik Kwon, Seoul (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

This patent is subject to a terminal disclaimer.

(21) Appl. No.: 15/875,869

(22) Filed: Jan. 19, 2018

(65) Prior Publication Data

US 2018/0141429 A1    May 24, 2018

Related U.S. Application Data

(63) Continuation-in-part of application No. 15/189,903, filed on Jun. 22, 2016, now Pat. No. 9,908,397.

(30) Foreign Application Priority Data

Nov. 27, 2015    (KR) .................. 10-2015-0167975

(51) Int. Cl.
*F16H 3/66* (2006.01)
*B60K 6/543* (2007.10)
(Continued)

(52) U.S. Cl.
CPC .............. *B60K 6/543* (2013.01); *B60K 6/365* (2013.01); *B60K 6/387* (2013.01); *B60K 6/48* (2013.01);
(Continued)

(58) Field of Classification Search
CPC . F16H 3/728; F16H 3/66; F16H 3/725; F16H 2200/0043; F16H 2200/2041;
(Continued)

(56) References Cited

U.S. PATENT DOCUMENTS 5,730,675 A * 3/1998 Yamaguchi ............ B60K 6/365
475/2
7,288,041 B2  10/2007 Bucknor
(Continued)

FOREIGN PATENT DOCUMENTS

DE  102013013947 A1 *  2/2015  ............ B60K 6/365
EP       0 845 618 A1    6/1998
JP        4566199 B2   10/2010

*Primary Examiner* — Roger L Pang
(74) *Attorney, Agent, or Firm* — Morgan, Lewis & Bockius LLP

(57) ABSTRACT

A power transmission system of a vehicle may include a first input shaft selectively connected to an engine, a second input shaft as a hollow shaft, enclosing the first input shaft without rotational interference with the first input shaft, and selectively connected to the engine, a speed change portion including first and second planetary gear sets, each planetary gear set including three rotation elements, and four rotation shafts directly connected to at least one rotation element among the rotation elements of the first and second planetary gear sets, a motor/generator, an output shaft, and control elements including two clutches disposed at positions where the first and second input shafts are selectively connected to an output shaft of the engine, and two brakes disposed at
(Continued)

positions where two rotation shafts among the four rotation shafts are selectively connected to a transmission housing.

6 Claims, 18 Drawing Sheets

(51) Int. Cl.
*F16H 3/72* (2006.01)
*B60K 6/365* (2007.10)
*B60K 6/48* (2007.10)
*B60K 6/387* (2007.10)
*F16H 3/44* (2006.01)
*B60K 6/38* (2007.10)

(52) U.S. Cl.
CPC ............... *F16H 3/66* (2013.01); *F16H 3/725* (2013.01); *F16H 3/728* (2013.01); *B60K 2006/381* (2013.01); *B60K 2006/4816* (2013.01); *B60Y 2200/92* (2013.01); *B60Y 2400/73* (2013.01); *F16H 2003/445* (2013.01); *F16H 2200/0043* (2013.01); *F16H 2200/2007* (2013.01); *F16H 2200/2041* (2013.01); *Y02T 10/6221* (2013.01); *Y02T 10/6252* (2013.01); *Y10S 903/911* (2013.01); *Y10S 903/918* (2013.01)

(58) Field of Classification Search
CPC ....... F16H 2200/2007; F16H 2003/445; B60K 6/543; B60K 6/48; B60K 6/365; B60K 2006/4816; B60Y 2200/92; B60Y 2400/73; Y10S 903/918; Y10S 903/911
USPC .............................................. 475/5, 275–291
See application file for complete search history.

(56) References Cited

U.S. PATENT DOCUMENTS

| | | |
|---|---|---|
| 7,931,555 B2 | 4/2011 | Iwanaka et al. |
| 8,777,812 B2 | 7/2014 | Matsubara et al. |
| 9,127,756 B2 * | 9/2015 | Beck .......................... F16H 3/66 |
| 2006/0189428 A1 | 8/2006 | Raghavan |
| 2006/0234821 A1 | 10/2006 | Bucknor |
| 2006/0240929 A1 | 10/2006 | Raghavan |
| 2006/0266144 A1 | 11/2006 | Schafer et al. |
| 2007/0219035 A1 | 9/2007 | Raghavan |
| 2008/0176696 A1 | 7/2008 | Bucknor |
| 2008/0176697 A1 | 7/2008 | Raghavan |
| 2012/0021861 A1 | 1/2012 | Sakai et al. |

\* cited by examiner

FIG. 2

| Speed stages | C1 | C2 | B1 | B2 | MG1 | Gear ratio |
|---|---|---|---|---|---|---|
| 1ST | ● |  |  | ● |  | 2.850 |
| 2ND | ● |  | ● |  |  | 1.532 |
| 3RD | ● | ● |  |  |  | 1.000 |
| 4TH |  | ● | ● |  |  | 0.713 |
| REV |  |  |  | ● | ● | 2.480 |

FIG. 9

| Speed stages | Control elements ||||| Gear ratio |
|---|---|---|---|---|---|---|
| | C1 | C2 | B1 | B2 | MG1/2 | |
| D1 | ● | | | ● | (●) | 2.850 |
| D2 | ● | | ● | | (●) | 1.532 |
| D3 | ● | ● | | | (●) | 1.000 |
| D4 | | ● | ● | | (●) | 0.713 |
| REV | | | | (●) | (●) | 2.480 |
| EV1 | | | | ● | ● | |
| EV2 | | | ● | | MG2 | |

FIG. 16

| Speed stages | Control elements ||||| Gear ratio |
|---|---|---|---|---|---|---|
| | C1 | C2 | B1 | B2 | MG1 | |
| D1 | ● | | | ● | (●) | 2.850 |
| D2 | ● | | ● | | (●) | 1.532 |
| D3 | ● | ● | | | (●) | 1.000 |
| D4 | | ● | ● | | (●) | 0.713 |
| REV | ● | | | | ● | 2.480 |
| EV | | | ● | | ● | |

FIG. 19

| Speed stages | Control elements | | | | | Gear ratio |
|---|---|---|---|---|---|---|
| | C1 | C2 | B1 | B2 | MG1/2 | |
| D1 | ● | | | ● | (●) | 2.850 |
| D2 | ● | | ● | | (●) | 1.532 |
| D3 | ● | ● | | | (●) | 1.000 |
| D4 | | ● | ● | | (●) | 0.713 |
| REV | ● | | | | MG1 | 2.480 |
| | | | | ● | MG2 | |
| EV1 | | | | ● | MG2 | |
| EV2 | | | ● | | MG1 | |

POWER TRANSMISSION SYSTEM OF VEHICLE

CROSS-REFERENCE TO RELATED APPLICATION

The present application is a Continuation-In-Part (CIP) of U.S. patent application Ser. No. 15/189,903, filed Jun. 22, 2016, which claims priority to Korean Patent Application No. 10-2015-0167975, filed Nov. 27, 2015, the entire contents of which are incorporated herein for all purposes by these references.

NAMES OF THE PARTIES TO A JOINT RESEARCH AGREEMENT

Hyundai Motor Company and KIA Motors Corporation were parties to a joint research agreement prior to the effective filing date of the instant application.

BACKGROUND OF THE INVENTION

Field of the Invention

The present invention relates to a power transmission system of a vehicle. More particularly, the present invention relates to a power transmission system of a vehicle that enhances power delivery efficiency and improves marketability of the vehicle by achieving at least four fixed speed stages and enabling continuous changing of a gear ratio using a motor.

Description of Related Art

Environmental-friendliness of vehicles is a very important technology on which future survival of the motor industry is dependent. Vehicle makers are focusing on development of environmentally-friendly vehicles so as to meet environment and fuel consumption regulations.

Therefore, vehicle manufacturers have been developing future vehicles such as electric vehicles (EV), hybrid electric vehicles (HEV), and fuel cell electric vehicles (FCEV).

Since the future vehicles have technical restrictions such as weight and cost, vehicle manufacturers focus on hybrid electric vehicles for meeting exhaust gas regulations and improving fuel consumption performance and are competing desperately to put the hybrid electric vehicles to practical use.

The hybrid electric vehicles are vehicles using at least two power sources, and the at least two power sources can be combined in various ways. Typically, the hybrid electric vehicles use gasoline engines or diesel engines using fossil fuel and motor/generators driven by electrical energy.

The hybrid electric vehicle uses the motor/generator having relatively improved low-speed torque characteristics as a main power source at a low-speed and uses an engine having relatively improved high-speed torque characteristics as a main power source at a high-speed.

Since the hybrid electric vehicle stops operation of the engine using fossil fuel and uses the motor/generator at a low-speed region, fuel consumption may be improved and exhaust gas may be reduced.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a power transmission system of a vehicle having advantages of enhancing power delivery efficiency by achieving at least four fixed speed stages and enabling continuous changing of a gear ratio using a motor.

According to various aspects of the present invention, a power transmission system of a vehicle may include an output shaft outputting torque, a first planetary gear set including first, second, and third rotation elements, a second planetary gear set including fourth, fifth, and sixth rotation elements, a first rotation shaft fixedly connected to the first rotation element, a second rotation shaft fixedly connected to the second rotation element and fixedly connected to the sixth rotation element, a third rotation shaft fixedly connected to the third rotation element, fixedly connected to the fifth rotation element, and fixedly connected to the output shaft, a fourth rotation shaft fixedly connected to the fourth rotation element, and a first motor/generator fixedly connected to the first rotation shaft or the second rotation shaft.

The first planetary gear set may be a single pinion planetary gear set, wherein a first sun gear is the first rotation element, a first planet carrier is the second rotation element, and a first ring gear is the third rotation element, and the second planetary gear set may be a single pinion planetary gear set, wherein a second sun gear is the fourth rotation element, a second planet carrier is the fifth rotation element, and a second ring gear is the sixth rotation element.

In various embodiments, the fourth rotation shaft may be fixedly connected to the second input shaft, the second rotation shaft may be fixedly connected to the first input shaft and selectively connected to a transmission housing, and the first rotation shaft may be selectively connected to the transmission housing and fixedly connected to the first motor/generator.

The power transmission system may further include a first clutch disposed between an engine output shaft and the second input shaft, a second clutch disposed between the engine output shaft and the first input shaft, a first brake disposed between the first rotation shaft and the transmission housing, and a second brake disposed between the second rotation shaft and the transmission housing.

The power transmission system may further include a second motor/generator fixedly connected to the fourth rotation shaft.

In various embodiments, the fourth rotation shaft may be fixedly connected to the second input shaft, the second rotation shaft may be fixedly connected to the first input shaft, selectively connected to a transmission housing, and fixedly connected to the first motor/generator, and the first rotation shaft may be selectively connected to the transmission housing.

The power transmission system may further include a first clutch disposed between an engine output shaft and the second input shaft, a second clutch disposed between the engine output shaft and the first input shaft, a first brake disposed between the first rotation shaft and the transmission housing, and a second brake disposed between the second rotation shaft and the transmission housing.

The power transmission system may further include a second motor/generator fixedly connected to the fourth rotation shaft.

According to various aspects of the present invention, a power transmission system of a vehicle may include an engine output shaft transmitting torque of an engine, an output shaft outputting torque, a first planetary gear set including first, second, and third rotation elements, a second planetary gear set including fourth, fifth, and sixth rotation elements, a first rotation shaft fixedly connected to the first rotation element, fixedly connected to a first motor/generator, and selectively connected to a transmission housing, a second rotation shaft fixedly connected to the second rotation element, fixedly connected to the sixth rotation element, selectively connected to the transmission housing, and selectively connected to the engine output shaft, a third rotation shaft fixedly connected to the third rotation element, fixedly connected to the fifth rotation element, and fixedly connected to the output shaft, and a fourth rotation shaft fixedly connected to the fourth rotation shaft and selectively connected to the engine output shaft.

The first planetary gear set may be a single pinion planetary gear set, wherein a first sun gear is the first rotation element, a first planet carrier is the second rotation element, and a first ring gear is the third rotation element, and the second planetary gear set may be a single pinion planetary gear set, wherein a second sun gear is the fourth rotation element, a second planet carrier is the fifth rotation element, and a second ring gear is the sixth rotation element.

The power transmission system may further include a first clutch selectively connecting the engine output shaft to the fourth rotation shaft, a second clutch selectively connecting the engine output shaft to the second rotation shaft, a first brake selectively connecting the first rotation shaft to the transmission housing, and a second brake selectively connecting the second rotation shaft to the transmission housing.

The power transmission system may further include a second motor/generator fixedly connected to the fourth rotation shaft.

According to various aspects of the present invention, a power transmission system of a vehicle may include an engine output shaft transmitting torque of an engine, an output shaft outputting torque, a first planetary gear set including first, second, and third rotation elements, a second planetary gear set including fourth, fifth, and sixth rotation elements, a first rotation shaft fixedly connected to the first rotation element and selectively connected to a transmission housing, a second rotation shaft fixedly connected to the second rotation element, fixedly connected to the sixth rotation element, selectively connected to the transmission housing, selectively connected to the engine output shaft, and fixedly connected to the first motor/generator, a third rotation shaft fixedly connected to the third rotation element, fixedly connected to the fifth rotation element, and fixedly connected to the output shaft, and a fourth rotation shaft fixedly connected to the fourth rotation shaft and selectively connected to the engine output shaft.

The first planetary gear set may be a single pinion planetary gear set, wherein a first sun gear is the first rotation element, a first planet carrier is the second rotation element, and a first ring gear is the third rotation element, and the second planetary gear set may be a single pinion planetary gear set, wherein a second sun gear is the fourth rotation element, a second planet carrier is the fifth rotation element, and a second ring gear is the sixth rotation element.

The power transmission system may further include a first clutch selectively connecting the engine output shaft to the fourth rotation shaft, a second clutch selectively connecting the engine output shaft to the second rotation shaft, a first brake selectively connecting the first rotation shaft to the transmission housing, and a second brake selectively connecting the second rotation shaft to the transmission housing.

The power transmission system may further include a second motor/generator fixedly connected to the first rotation shaft.

The various embodiments of the present invention may achieve four fixed speed stages and may change gear ratios continuously using a motor by combining input devices being a dual clutch, a speed change portion including planetary gear sets and friction elements, and a motor/generator enabling of driving and regenerative braking. Therefore, power delivery efficiency may be enhanced and marketability of the vehicle may be improved.

In addition, a length of a transmission may be shortened by reducing a space at which a conventional torque converter exists, and driving loss by the torque converter may be reduced.

In addition, since coasting energy can be used for regenerative braking and generating electricity by the motor/generator, fuel consumption may be greatly improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of control elements at each speed stage applied to the first exemplary power transmission system of the vehicle according to the present invention.

FIG. 9 is an operational chart of control elements at each speed stage applied to the second exemplary power transmission system of the vehicle according to the present invention.

FIG. 16 is an operation chart of control elements at each speed stage applied to the third exemplary power transmission system of the vehicle according to the present invention.

FIG. 19 is an operation chart of control elements at each speed stage applied to the fourth exemplary power transmission system of the vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
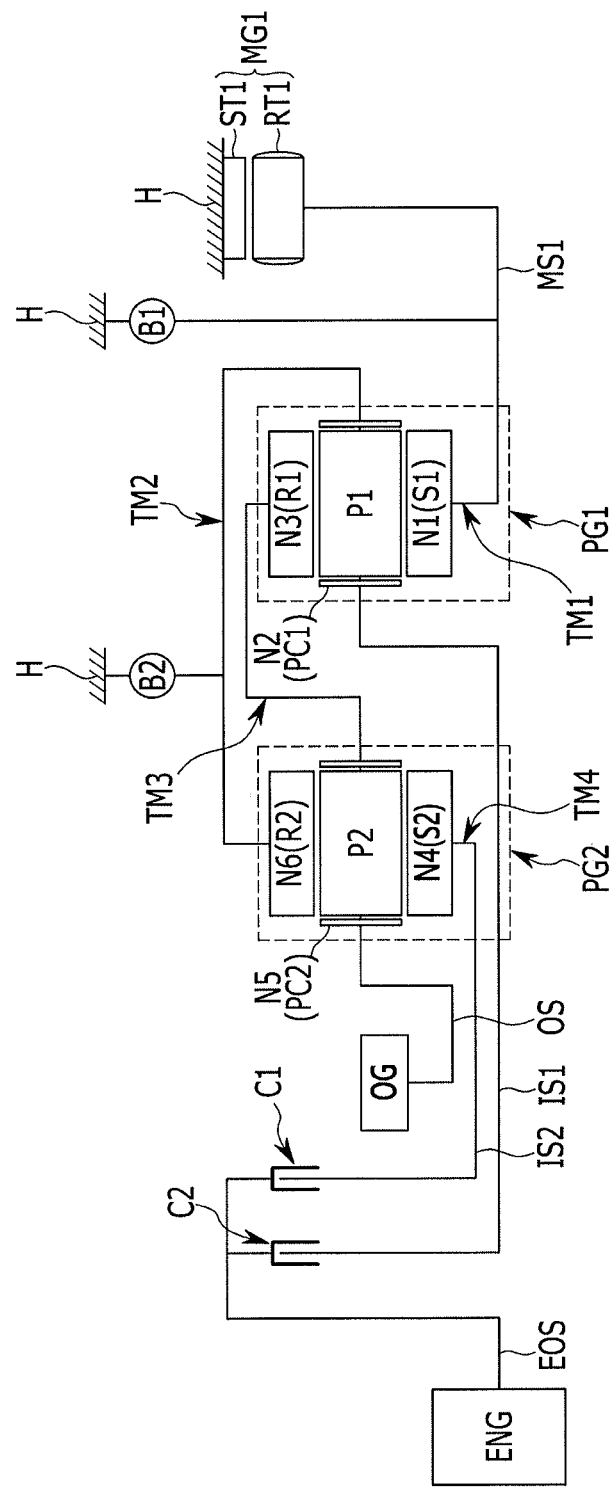
FIG. 1 is a schematic diagram of a first exemplary power transmission system of a vehicle according to the present invention.

FIG. 1 is a schematic diagram of a power transmission system of a vehicle according to various embodiments of the present invention. Referring to FIG. 1, a power transmission system of a vehicle according to various embodiments of the present invention uses an engine ENG and a first motor/generator MG1 as power sources, and includes first and second planetary gear sets PG1 and PG2 disposed on the same axis, first and second input shafts IS1 and IS2, an output shaft OS, four rotation shafts TM1 to TM4 connected to at least one of rotation elements of the first and second planetary gear sets PG1 and PG2, and four control elements C1, C2, B1, and B2.

Torque input from the first and second input shafts IS1 and IS2 and a first motor shaft MS1 is changed through the first and second planetary gear sets PG1 and PG2, and the changed torque is output through the output shaft OS.

The first input shaft IS1 and the first motor shaft MS1 are solid shafts and disposed on the same axis. The second input shaft IS2 is a hollow shaft and encloses the first input shaft IS1 without rotational interference therewith.

In addition, the first and second input shafts IS1 and IS2 are selectively connected to an engine output shaft EOS through first and second clutches C1 and C2. That is, the first input shaft IS1 is selectively connected to the engine output shaft EOS through the second clutch C2, and the second input shaft IS2 is selectively connected to the engine output shaft EOS through the first clutch C1.

The engine ENG is a main power source, and a gasoline engine or a diesel engine using conventional fossil fuel may be used as the engine.

The first motor/generator MG1 functions as a motor and a generator, and includes a first stator ST1 fixed to a transmission housing H and a first rotor RT1 rotatably supported in a radial interior of the first stator ST1. The first rotor RT1 is fixedly connected to the first motor shaft MS1.

A speed change portion including the first and second planetary gear sets PG1 and PG2 is disposed between the engine ENG and the first motor/generator MG1. The first planetary gear set PG1 is disposed close to the first motor/generator MG1 and the second planetary gear set PG2 is disposed close to the engine ENG.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

Since the second rotation element N2 is directly connected to the sixth rotation element N6 and the third rotation element N3 is directly connected to the fifth rotation element N5, the first and second planetary gear sets PG1 and PG2 includes four rotation shafts TM1 to TM4.

The four rotation shafts TM1 to TM4 will be described in detail.

The first rotation shaft TM1 is fixedly connected to the first rotation element N1 (first sun gear S1), is fixedly connected to the first motor shaft MS1, and is selectively connected to the transmission housing H.

The second rotation shaft TM2 fixedly connects the second rotation element N2 (first planet carrier PC1) with the sixth rotation element N6 (second ring gear R2), is fixedly connected to the first input shaft IS1 so as to be selectively connected to the engine output shaft EOS, is selectively connected to the transmission housing H.

The third rotation shaft TM3 fixedly connects the third rotation element N3 (first ring gear R1) with the fifth rotation element N5 (second planet carrier PC2), and is fixedly connected to an output gear OG through the output shaft OS so as to be operated as an output element continuously.

The four rotation shafts fixedly connects a plurality of rotation elements among the rotation elements of the planetary gear sets PG1 and PG2 with each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "fixedly connected" or the like means at least two members are connected to each other to continuously rotate without rotational speed difference. That is, at least two members that are fixedly connected to each other always rotate with the same rotation speed and in the same rotation direction.

Here, the term "selectively connected" or the like means a plurality of shafts including the input shaft and the output shaft are connectable to each other through at least one of the control elements to rotate with the same rotation speed and the same rotation direction, or are connectable to the transmission housing through at least one of the control elements to be fixed to the transmission housing.

In other words, in a case that the control element selectively connects a plurality of shafts to each other, the plurality of shafts rotate with the same rotation speed and in the same rotation direction when the control element operates, but the plurality of shafts are disconnected from each other when the control element is released.

In addition, in a case that the control element selectively connects any one shaft to the transmission housing, the corresponding shaft is fixedly connected to the transmission housing when the control element operates, but the corresponding shaft is rotatable when the control element is released.

In addition, the description that a rotation shaft or an input shaft is connected to a motor/generator means the corresponding shaft is fixedly connected to a rotor of the motor/generator.

Arrangement of the two clutches C1 and C2 and the two brakes B1 and B2 will be described in detail.

The first clutch C1 is disposed between the engine output shaft EOS and the second input shaft IS2 and selectively connects the engine output shaft EOS with the second input shaft IS2.

The second clutch C2 is disposed between the engine output shaft EOS and the first input shaft IS1 and selectively connects the engine output shaft EOS with the first input shaft IS1.

The first brake B1 is disposed between the first rotation shaft TM1 and the transmission housing H and causes the first rotation shaft TM1 to be operated as a selective fixed element.

The second brake B2 is disposed between the second rotation shaft TM2 and the transmission housing H and causes the second rotation shaft TM2 to be operated as a selective fixed element.

FIG. 2 is an operational chart of control elements at each speed stage applied to a power transmission system of a vehicle according to various embodiments of the present invention. As shown in FIG. 2, operation of the control elements at fixed speed stages will be described in detail.

The first clutch C1 and the second brake B2 are operated at a first forward speed stage 1ST.

The first clutch C1 and the first brake B1 are operated at a second forward speed stage 2ND.

The first clutch C1 and the second clutch C2 are operated at a third forward speed stage 3RD.

The second clutch C2 and the first brake B1 are operated at a fourth forward speed stage 4TH.

The second brake B2 is operated at a reverse speed stage REV. In this case, the first motor/generator MG1 is also operated.

Figure 3:
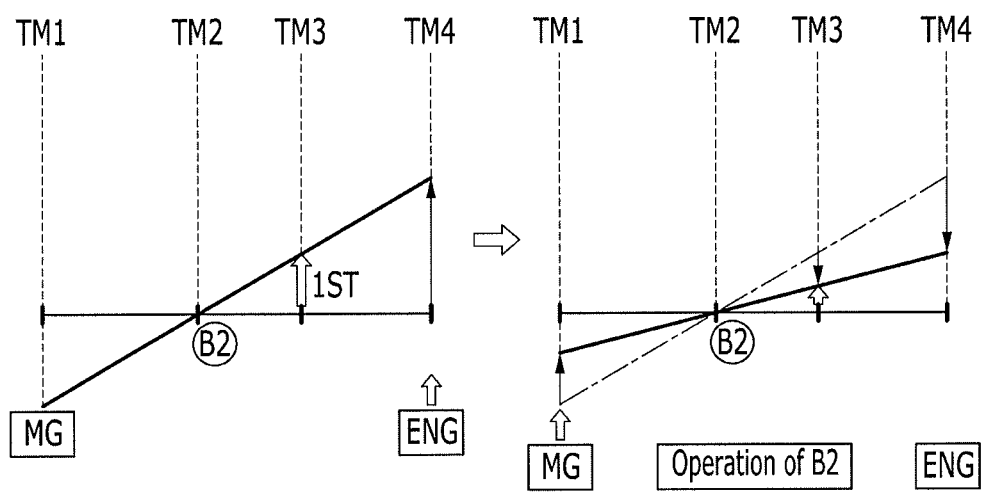
FIG. 3 is a lever diagram at a first forward speed stage in the first exemplary power transmission system of the vehicle according to the present invention.
Figure 3:
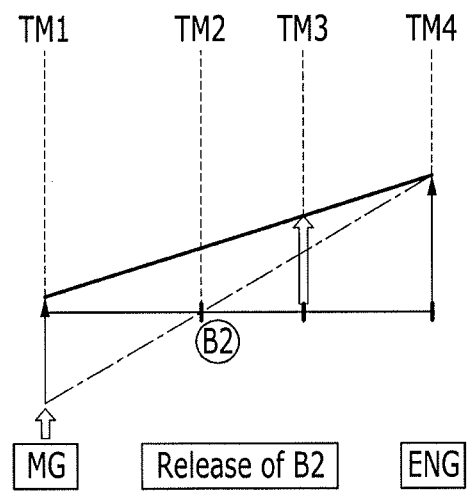

FIG. 3 is a lever diagram at a first forward speed stage in a power transmission system of a vehicle according to various embodiments of the present invention. Referring to FIG. 3, the first clutch C1 and the second brake B2 are operated at the first forward speed stage 1ST.

In addition, in a state that torque of the engine ENG is input to the fourth rotation shaft TM4 by operation of the first clutch C1, the second rotation shaft TM2 is operated as the fixed element by operation of the second brake B2. Therefore, the torque of the engine ENG is shifted into the first forward speed stage, and the first forward speed stage is output through the third rotation shaft TM3 that is the output element.

The first motor/generator MG1 can generate electricity and can assist torque through inverse rotation of the first motor/generator MG1 at the first forward speed stage 1ST.

Continuous change of gear ratio by the first motor/generator MG1 at the first forward speed stage 1ST can be changed according to whether the second brake B2 is operated.

In a state that the second brake B2 is operated, the torque of the engine ENG is controlled not to be input to the speed change portion and a gear ratio can be increased by controlling an inverse rotation speed of the first motor/generator MG1.

In a state that the second brake B2 is not operated, the torque of the engine ENG is controlled to be input to the speed change portion and a gear ratio can be decreased by controlling the inverse rotation speed of the first motor/generator MG1.

Figure 4:
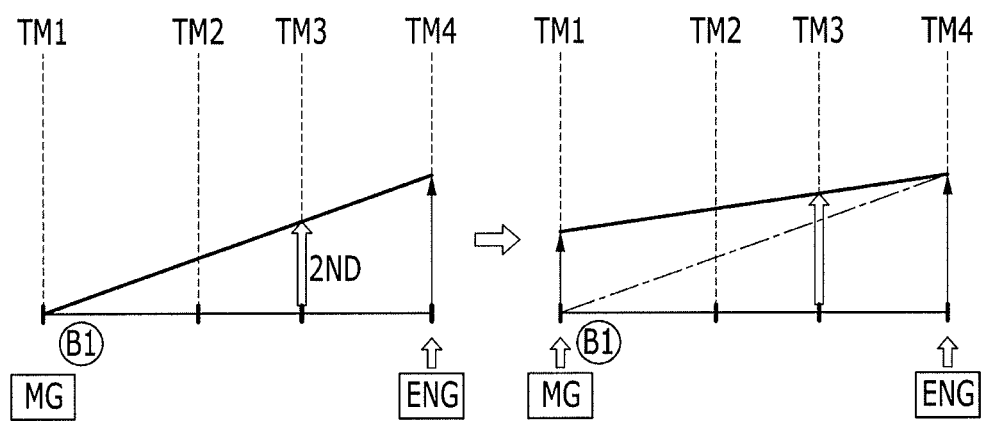
FIG. 4 is a lever diagram at a second forward speed stage in the first exemplary power transmission system of the vehicle according to the present invention.

FIG. 4 is a lever diagram at a second forward speed stage in a power transmission system of a vehicle according to various embodiments of the present invention. Referring to FIG. 4, the first clutch C1 and the first brake B1 are operated at the second forward speed stage 2ND.

In a state that the torque of the engine ENG is input to the fourth rotation shaft TM4 by operation of the first clutch C1, the first rotation shaft TM1 is operated as the fixed element by operation of the first brake B1. Therefore, the torque of the engine ENG is shifted into the second forward speed stage, and the second forward speed stage is output through the third rotation shaft TM3 that is the output element.

If a gear ratio is to be changed continuously by the first motor/generator MG1 at the second forward speed stage 2ND, the first brake B1 is released and the torque of the engine ENG is controlled to be input to the speed change portion. In this case, the gear ratio can be changed by controlling a rotation speed of the first motor/generator MG1.

Figure 5:
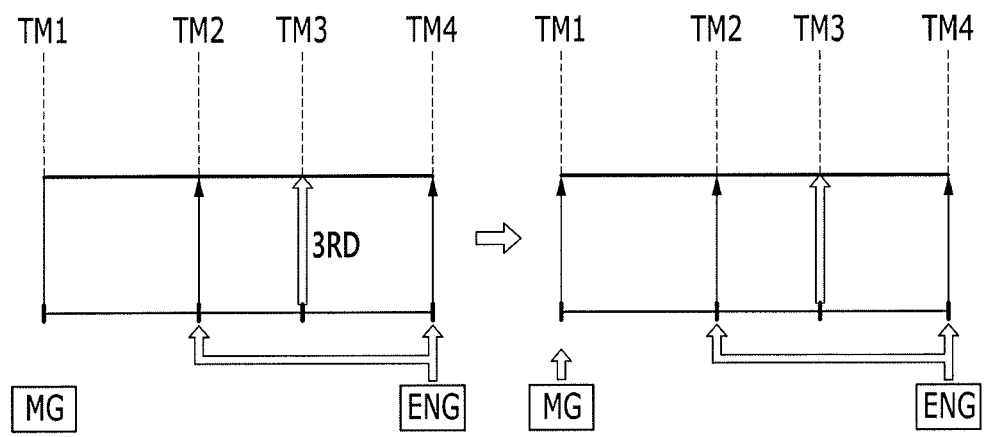
FIG. 5 is a lever diagram at a third forward speed stage in the first exemplary power transmission system of the vehicle according to the present invention.

FIG. 5 is a lever diagram at a third forward speed stage in a power transmission system of a vehicle according to various embodiments of the present invention. Referring to FIG. 5, the first clutch C1 and the second clutch C2 are operated at the third forward speed stage 3RD.

The torque of the engine ENG is simultaneously input to the fourth rotation shaft TM4 and the second rotation shaft TM2 by operation of the first clutch C1 and the second clutch C2. In this case, the first and second planetary gear sets PG1 and PG2 become lock-up states. Therefore, the torque of the engine ENG is shifted into the third forward speed stage, and the third forward speed stage is output through the third rotation shaft TM3 that is the output element. The same rotation speed with the engine ENG is output at the third forward speed stage.

In addition, the first motor/generator MG1 can assist torque by rotating in a positive direction at the third forward speed stage.

Figure 6:
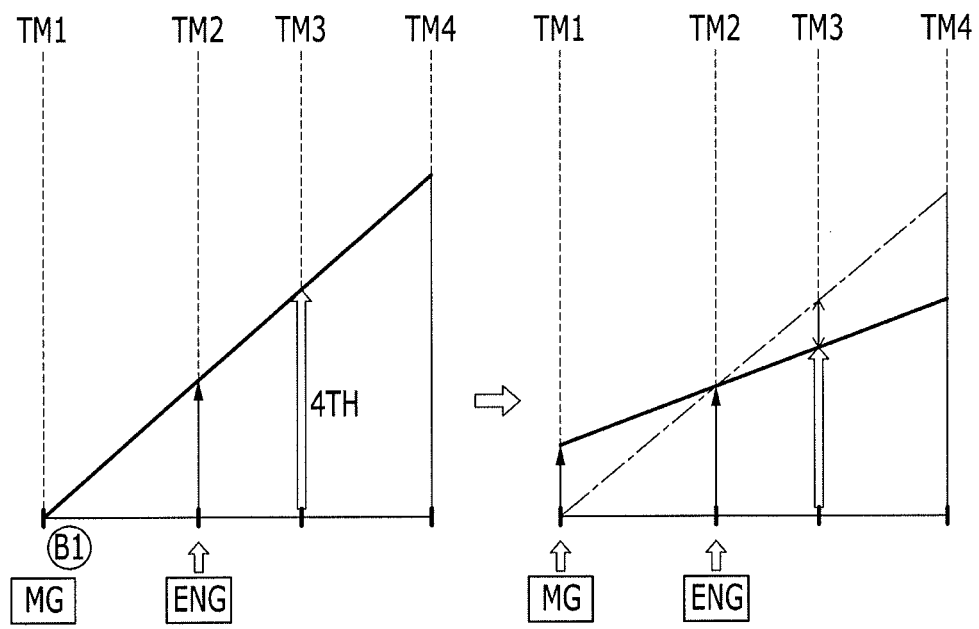
FIG. 6 is a lever diagram at a fourth forward speed stage in the first exemplary power transmission system of the vehicle according to the present invention.

FIG. 6 is a lever diagram at a fourth forward speed stage in a power transmission system of a vehicle according to various embodiments of the present invention. Referring to FIG. 6, the second clutch C2 and the first brake B1 are operated at the fourth forward speed stage 4TH.

In a state that the torque of the engine ENG is input to the second rotation shaft TM2 by operation of the second clutch C2, the first rotation shaft TM1 is operated as the fixed element by operation of the first brake B1. Therefore, the torque of the engine ENG is shifted into the fourth forward speed stage, and the fourth forward speed stage is output through the third rotation shaft TM3 that is the output element.

If a gear ratio is to be continuously changed by the first motor/generator MG1 at the fourth forward speed stage 4TH, the first brake B1 is released and the torque of the engine ENG is controlled to be input to the speed change portion. At this state, the gear ratio can be changed by controlling the inverse or the positive rotation speed of the first motor/generator MG1.

Figure 7:
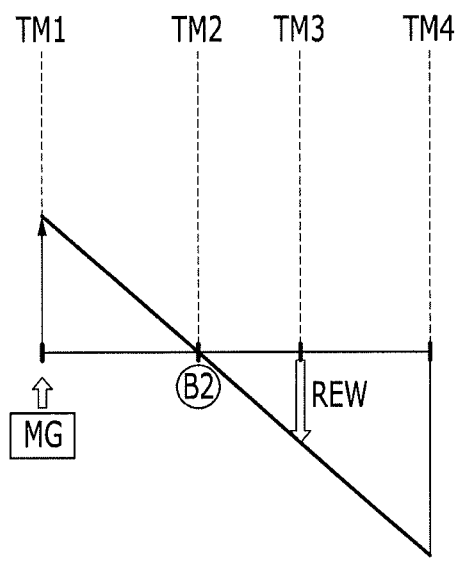
FIG. 7 is a lever diagram at a reverse speed stage in the first exemplary power transmission system of the vehicle according to the present invention.

Referring to FIG. 7, in a stopped state of the engine ENG, the second brake B2 is operated and the first motor/generator MG1 is also operated at the reverse speed stage REV.

In a state that torque of the first motor/generator MG1 is input to the first rotation shaft TM1, the second rotation shaft TM2 is operated as the fixed element by operation of the second brake B2 and the inverse rotation speed is output. That is, the torque of the first motor/generator MG1 is shifted into the reverse speed stage, and the reverse speed stage is output through the third rotation shaft TM3 that is the output element.

The power transmission system according to various embodiments of the present invention achieves four fixed speed stages and changes gear ratios continuously using a motor by combining input devices including a dual clutch, a speed change portion including planetary gear sets and control elements, and a first motor/generator enabling of driving and regenerative braking. Therefore, power delivery efficiency may be enhanced and marketability of the vehicle may be improved.

In addition, a length of a transmission may be shortened by reducing a space at which a conventional torque converter exists, and driving loss by the torque converter may be reduced.

In addition, since coasting energy can be used for regenerative braking and generating electricity by the first motor/generator, fuel consumption may be greatly improved.

Figure 8:
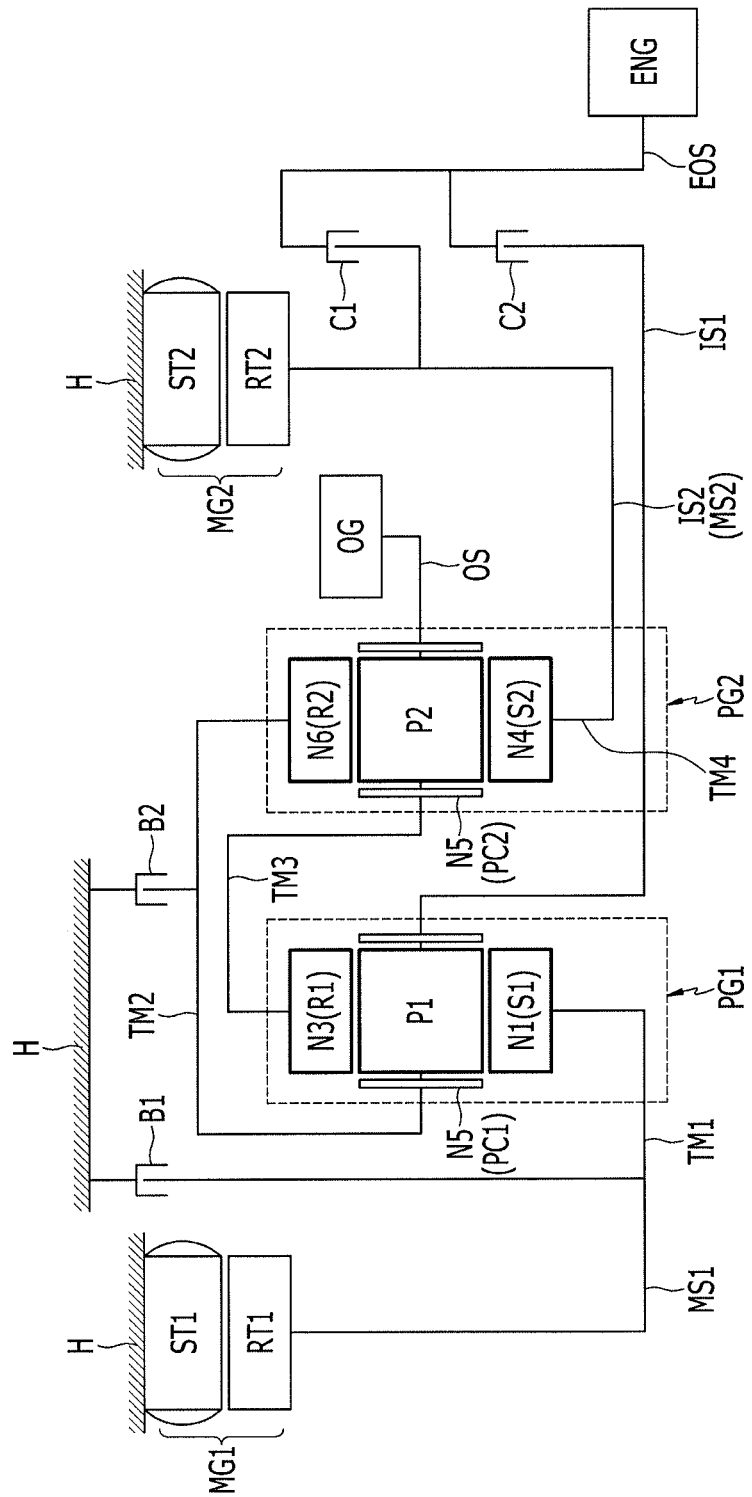
FIG. 8 is a schematic diagram of a second exemplary power transmission system of a vehicle according to the present invention.

FIG. 8 is a schematic diagram of a power transmission system of a vehicle according to various embodiments of the present invention. Referring to FIG. 8, a power transmission system of a vehicle according to various embodiments of the present invention uses an engine ENG and first and second motor/generators MG1 and MG2 as power sources, and includes first and second planetary gear sets PG1 and PG2, an output shaft OS, four rotation shafts TM1 to TM4 connected to at least one of rotation elements of the first and second planetary gear sets PG1 and PG2, four control elements C1, C2, B1, and B2, and a transmission housing H.

Torque of the engine ENG and torque of the first and the second motor/generator MG1 and MG2 is changed through the first and second planetary gear sets PG1 and PG2, and the changed torque is output through the output shaft OS.

The power transmission system of the vehicle illustrated in FIG. 8 is formed by adding the second motor/generator MG 2 to the power transmission system of the vehicle illustrated in FIG. 1.

The second motor/generator MG2 functions as a motor and a generator, and includes a second stator ST2 fixed to the transmission housing H and a second rotor RT2 rotatably supported in a radial interior of the second stator ST2. The second rotor RT2 is fixedly connected to a second motor shaft MS2. In addition, the second motor shaft MS2 is fixedly connected to the second input shaft IS2.

FIG. 9 is an operational chart of control elements at each speed stage applied to a power transmission system of a vehicle according to various embodiments of the present invention, and FIG. 10 to FIG. 14 are lever diagrams at fixed speed stages.

Referring to FIG. 9, the first clutch C1 and the second brake B2 are operated at the first forward speed stage 1ST.

Figure 10:
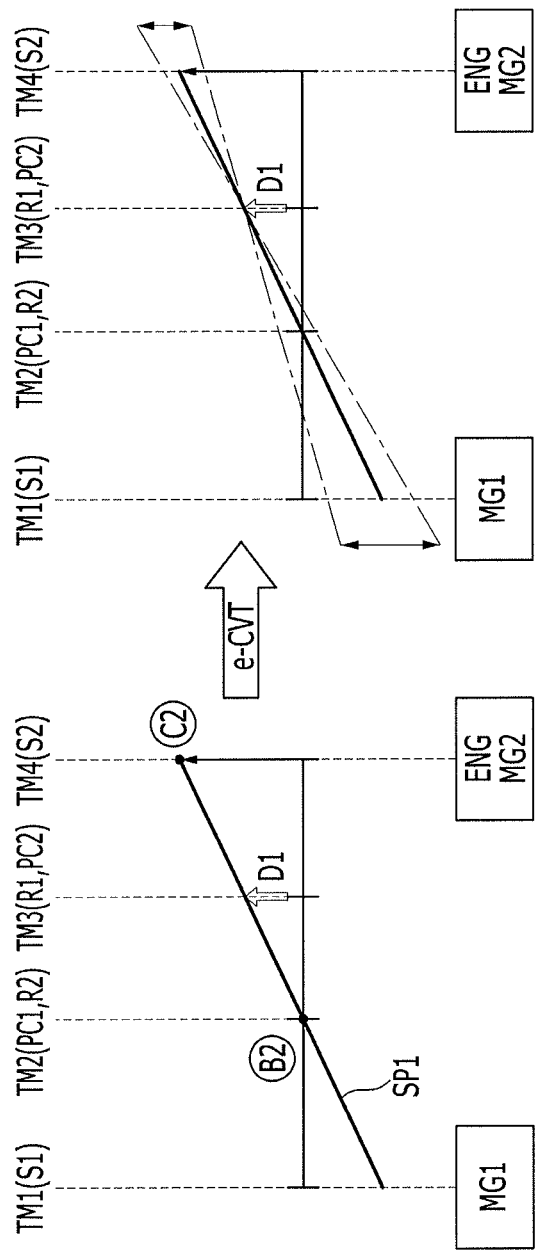
FIG. 10 is a lever diagram at a first forward speed stage in the second exemplary power transmission system of the vehicle according to the present invention.

As shown in FIG. 10, in a state that torque of the engine ENG is input to the fourth rotation shaft TM4 by operation of the first clutch C1, the second rotation shaft TM2 is operated as the fixed element by operation of the second brake B2. Therefore, the four rotation shafts form a first shift line SP1 and D1 is output through the third rotation shaft TM3.

An electric-continuously variable transmission (e-CVT) can be achieved at the first forward speed stage. At an e-CVT mode, the second brake B2 is released and rotation speed of the engine ENG can be increased or decreased by operation of the first motor/generator MG1. At this time, torque can be assisted by the second motor/generator MG2.

Referring to FIG. 9, the first clutch C1 and the first brake B1 are operated at the second forward speed stage 2ND.

Figure 11:
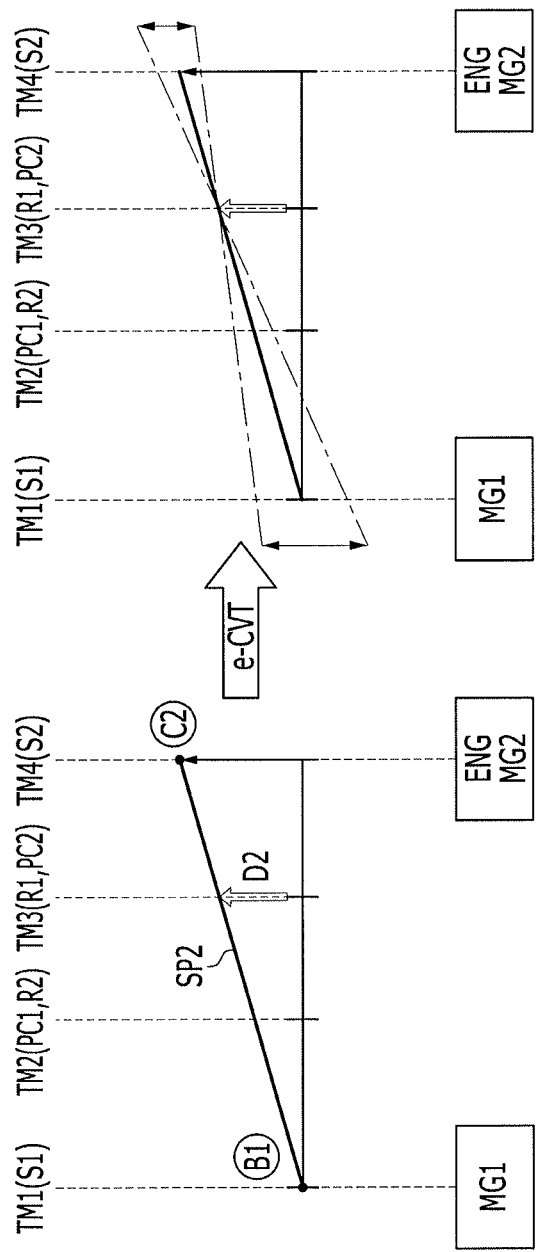
FIG. 11 is a lever diagram at a second forward speed stage in the second exemplary power transmission system of the vehicle according to the present invention.

As shown in FIG. 11, in a state that the torque of the engine ENG is input to the fourth rotation shaft TM4 by operation of the first clutch C1, the first rotation shaft TM1 is operated as the fixed element by operation of the first brake B1. Therefore, the four rotation shafts form a second shift line SP2 and D2 is output through the third rotation shaft TM3.

The e-CVT can be achieved at the second forward speed stage. At the e-CVT mode, the first brake B1 is released and the rotation speed of the engine ENG can be increased or decreased by operation of the first motor/generator MG1. At this time, torque can be assisted by the second motor/generator MG2.

Referring to FIG. 9, the first clutch C1 and the second clutch C2 are operated at the third forward speed stage 3RD.

Figure 12:
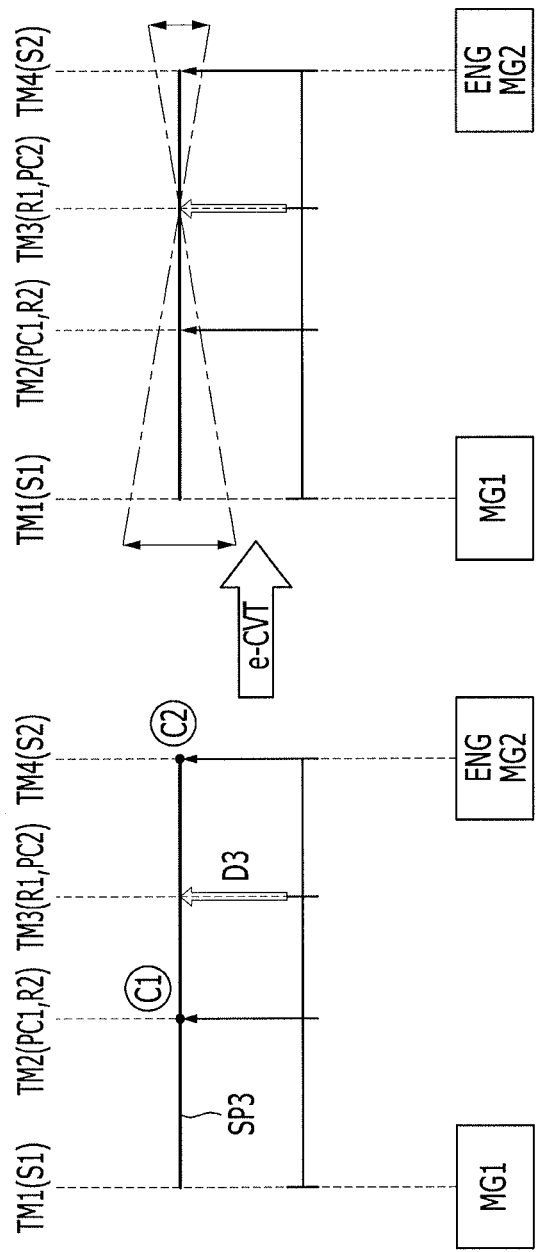
FIG. 12 is a lever diagram at a third forward speed stage in the second exemplary power transmission system of the vehicle according to the present invention.

As shown in FIG. 12, the torque of the engine ENG is simultaneously input to the fourth rotation shaft TM4 and the second rotation shaft TM2 by operation of the first clutch C1 and the second clutch C2. In this case, the first and second planetary gear sets PG1 and PG2 become lock-up states. Therefore, the four rotation shafts form a third shift line SP3 and D3 is output through the third rotation shaft TM3.

The e-CVT can be achieved at the first forward speed stage. At the e-CVT mode, the first clutch C1 is released, a ratio of input/output is changed by increasing or decreasing rotation speed of the second motor/generator MG2, and torque can be assisted by using any one of the first and the second motor/generators MG1 and MG2.

Referring to FIG. 9, the second clutch C2 and the first brake B1 are operated at the fourth forward speed stage 4TH.

Figure 13:
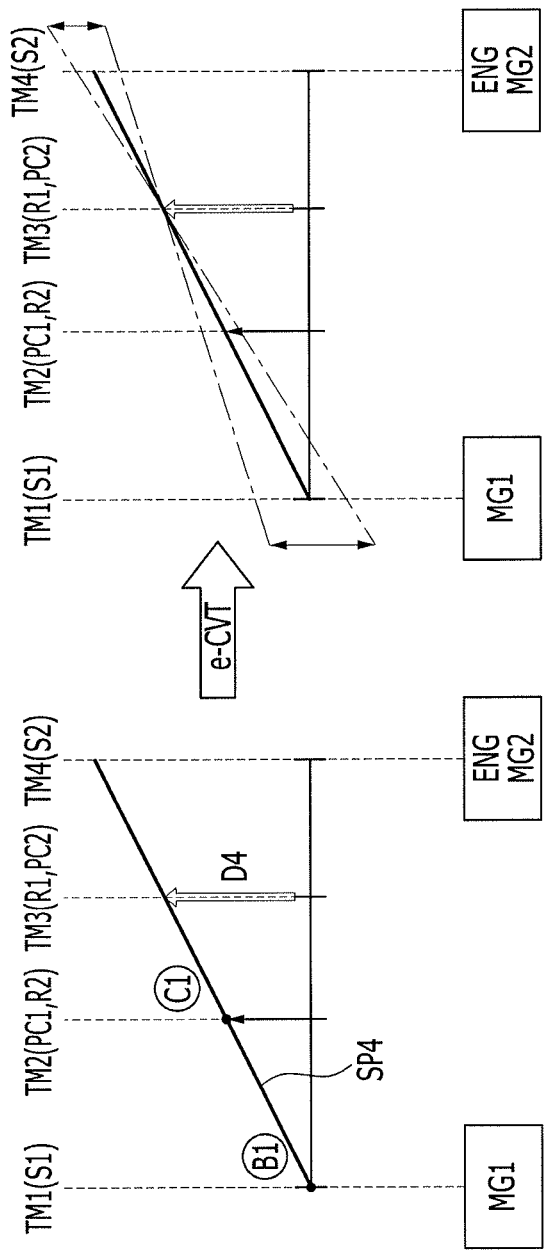
FIG. 13 is a lever diagram at a fourth forward speed stage in the second exemplary power transmission system of the vehicle according to the present invention.
Figure 14:
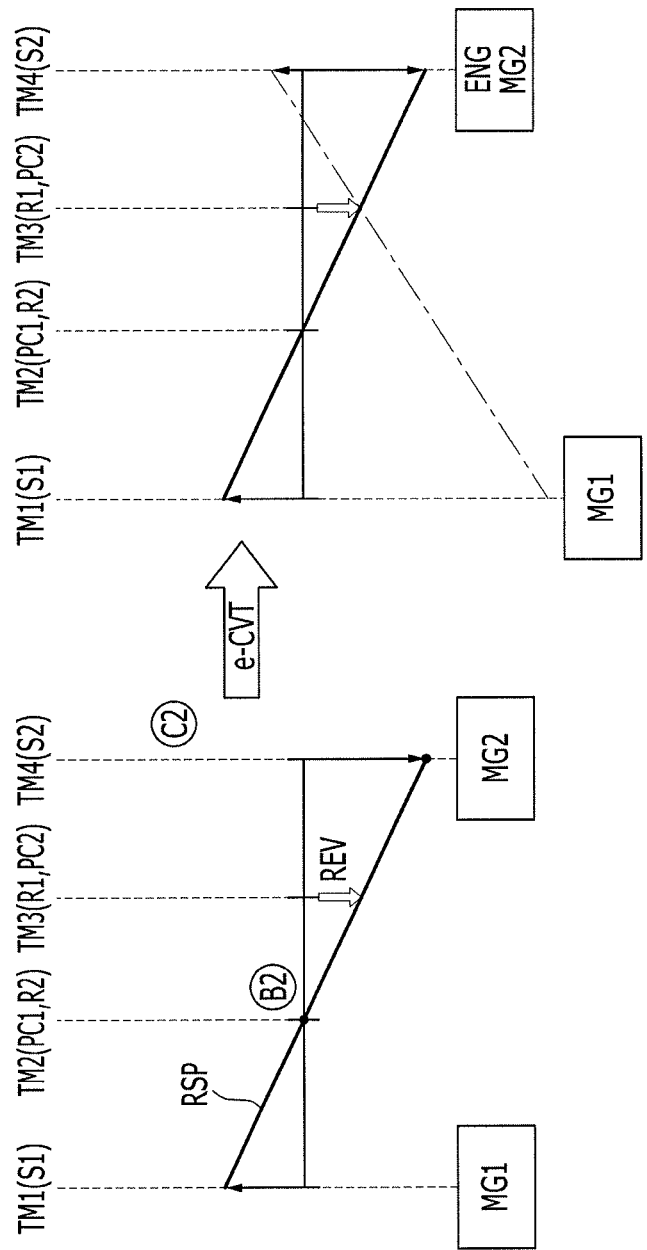
FIG. 14 is a lever diagram at a reverse speed stage in the second exemplary power transmission system of the vehicle according to the present invention.

As shown in FIG. 13, in a state that the torque of the engine ENG is input to the second rotation shaft TM2 by operation of the second clutch C2, the first rotation shaft TM1 is operated as the fixed element by operation of the first brake B1. Therefore, the four rotation shafts form a fourth shift line SP4 and D4 is output through the third rotation shaft TM3.

The e-CVT can be achieved at the fourth forward speed stage. At the e-CVT mode, the first brake B1 is released and the rotation speed of the engine ENG can be increased or decreased by operation of the first motor/generator MG1 or the second motor/generator MG2. At this time, torque can be assisted by the second motor/generator MG2 or the first motor/generator MG1.

The reverse speed stage REV can be achieved in three ways.

In the first way, only the torque of the first motor/generator MG1 is used. In a state that the torque of the first motor/generator MG1 is input to the first rotation shaft TM1, the second rotation shaft TM2 is operated as the fixed element by operation of the second brake B2. Therefore, the four rotation shafts form a reverse shift line RSP and REV is output through the third rotation shaft TM3.

In the second way, only the torque of the second motor/generator MG2 is used. In a state that the torque of the second motor/generator TM2 is input to the fourth rotation shaft TM4, the second rotation shaft TM2 is operated as the fixed element by operation of the second brake B2. Therefore, the four rotation shafts form the reverse shift line RSP and the REV is output through the third rotation shaft TM3.

In the third way, the torque of the engine ENG is used. In this case, the second brake B2 is released and the reverse speed stage can be achieved by inverse rotation of the first motor/generator MG1. At this time, torque can be assisted by the second motor/generator MG2.

The power transmission system of a vehicle according to various embodiments of the present invention can achieve two electric vehicle modes EV1 and EV2. In a state that the second brake B2 is operated, the first motor/generator MG1 is operated, the second motor/generator MG2 is operated, or both of the first and the second motor/generator MG1 and MG2 are operated at the first electric vehicle mode EV1. In a state that the first brake B1 is operated, the second motor/generator MG2 is operated at the second electric vehicle mode EV2.

Figure 15:
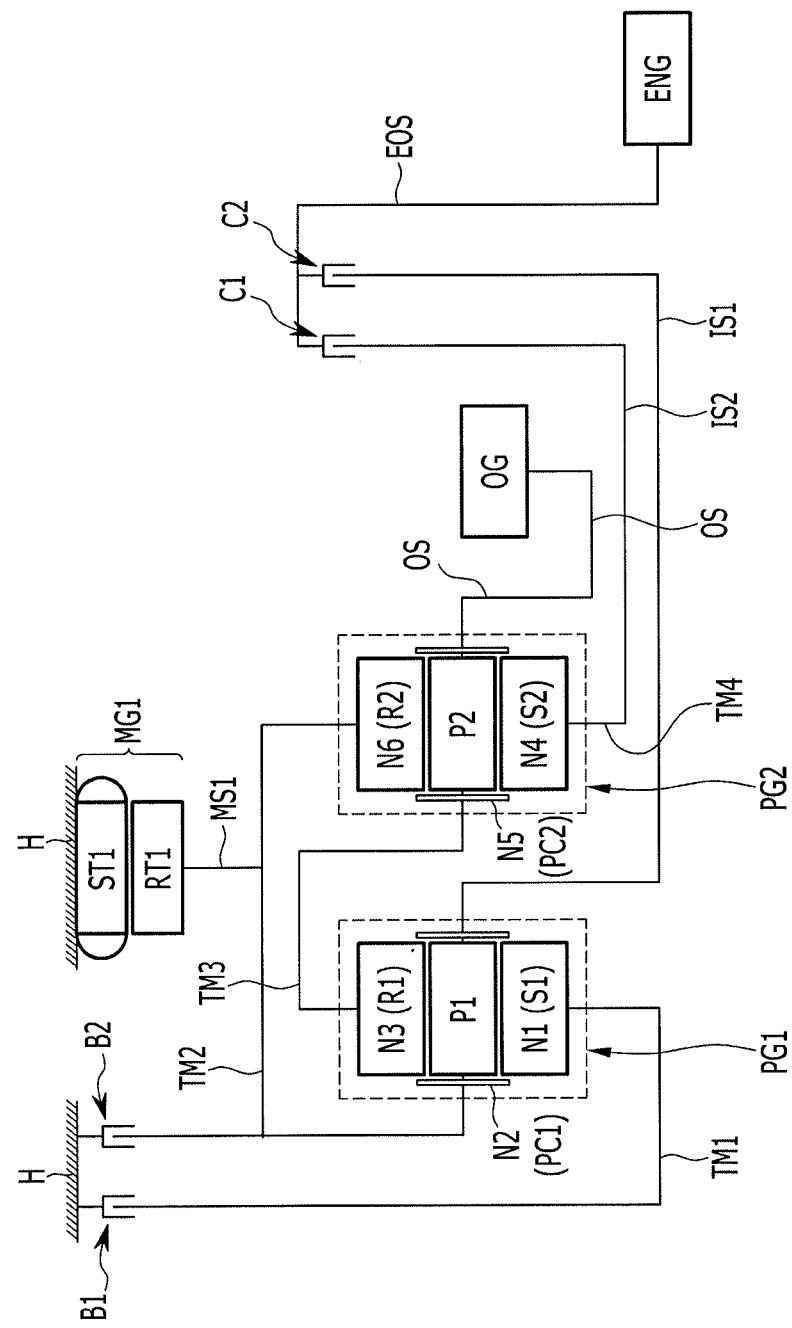
FIG. 15 is a schematic diagram of a third exemplary power transmission system of a vehicle according to the present invention.

FIG. 15 is a schematic diagram of a power transmission system of a vehicle according to various embodiments of the present invention. Referring to FIG. 15, a power transmission system of a vehicle according to various embodiments of the present invention uses an engine ENG and a first motor/generators MG1 as power sources, and includes first and second planetary gear sets PG1 and PG2, an output shaft OS, four rotation shafts TM1 to TM4 connected to at least one of rotation elements of the first and second planetary gear sets PG1 and PG2, four control elements C1, C2, B1, and B2, and a transmission housing H.

Torque of the engine ENG and torque of the first motor/generator MG1 is changed through the first and second planetary gear sets PG1 and PG2, and the changed torque is output through the output shaft OS.

The power transmission system illustrated in FIG. 15 is similar to that illustrated in FIG. 1, but a rotation shaft fixedly connected to the first motor/generator MG1 is different therebetween. That is, the first motor/generator MG1 is fixedly connected to the first rotation shaft TM1 in the power transmission system illustrated in FIG. 1, but the first motor/generator MG1 is fixedly connected to the second rotation shaft TM2 in the power transmission system illustrated in FIG. 15.

Figure 17:
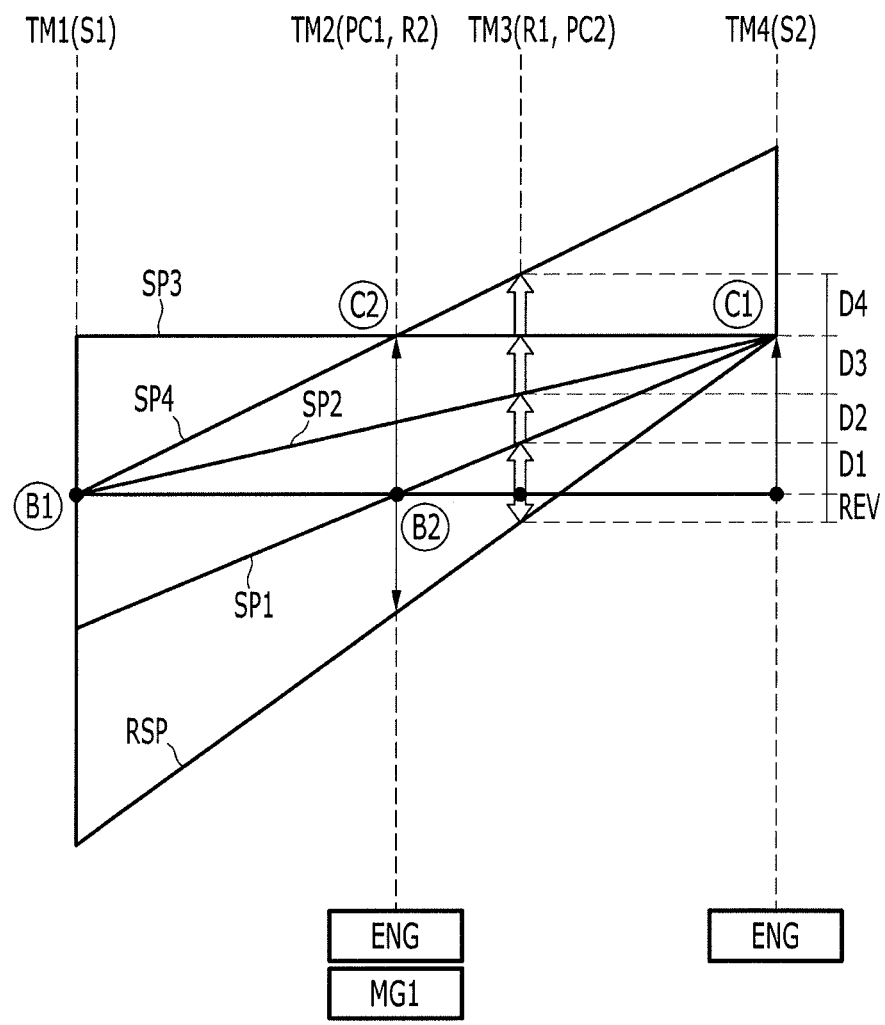
FIG. 17 is a lever diagram at each speed stage in the third exemplary power transmission system of the vehicle according to the present invention.

FIG. 16 is an operational chart of control elements at each speed stage applied to a power transmission system of a vehicle according to various embodiments of the present invention, and FIG. 17 is a lever diagram at fixed speed stages.

Referring to FIG. 16, the first clutch C1 and the second brake B2 are operated at the first forward speed stage 1ST.

As shown in FIG. 17, in a state that torque of the engine ENG is input to the fourth rotation shaft TM4 by operation of the first clutch C1, the second rotation shaft TM2 is operated as the fixed element by operation of the second brake B2. Therefore, the four rotation shafts form a first shift line SP1 and D1 is output through the third rotation shaft TM3.

An electric-continuously variable transmission (e-CVT) can be achieved at the first forward speed stage. At an e-CVT mode, the second brake B2 is released and rotation speed of the engine ENG can be controlled by operation of the first motor/generator MG1.

Referring to FIG. 16, the first clutch C1 and the first brake B1 are operated at the second forward speed stage 2ND.

As shown in FIG. 17, in a state that the torque of the engine ENG is input to the fourth rotation shaft TM4 by operation of the first clutch C1, the first rotation shaft TM1 is operated as the fixed element by operation of the first brake B 1. Therefore, the four rotation shafts form a second shift line SP2 and D2 is output through the third rotation shaft TM3.

The e-CVT can be achieved in two ways at the second forward speed stage. In the first way, the rotation speed of the engine ENG can be controlled by operation of the first motor/generator MG1 in a state that the first brake is operated. In the second way, the rotation speed of the engine ENG can be controlled by operation of the first motor/generator in a state that the first brake B1 is released.

Referring to FIG. 16, the first clutch C1 and the second clutch C2 are operated at the third forward speed stage 3RD.

As shown in FIG. 17, the torque of the engine ENG is simultaneously input to the fourth rotation shaft TM4 and the second rotation shaft TM2 by operation of the first clutch C1 and the second clutch C2. In this case, the first and second planetary gear sets PG1 and PG2 become lock-up states. Therefore, the four rotation shafts form a third shift line SP3 and D3 is output through the third rotation shaft TM3.

Since the first and second planetary gear sets PG1 and PG2 are lock-up states at the third forward speed stage, the torque of the first motor/generator MG1 can assist the torque of the engine ENG.

Referring to FIG. 16, the second clutch C2 and the first brake B1 are operated at the fourth forward speed stage 4TH.

As shown in FIG. 17, in a state that the torque of the engine ENG is input to the second rotation shaft TM2 by operation of the second clutch C2, the first rotation shaft TM1 is operated as the fixed element by operation of the first brake B1. Therefore, the four rotation shafts form a fourth shift line SP4 and D4 is output through the third rotation shaft TM3.

The e-CVT can be achieved at the fourth forward speed stage. At the e-CVT mode, the rotation speed of the engine ENG can be controlled by operation of the first motor/generator MG1 without release of the first brake B1.

Torque of the engine ENG and torque of the first motor/generator MG1 is used at the reverse speed stage REV.

In a state that the torque of the engine ENG is input to the fourth rotation shaft TM4 by operation of the first clutch C1, the first motor/generator MG1 is rotated inversely. In this case, the four rotation shafts form a reverse shift line RSP and REV is output through the third rotation shaft TM3.

At an electric vehicle EV mode, the vehicle can travel by propulsion of the first motor/generator MG1. In this case, the first motor/generator MG1 is operated in a state that the first brake B1 is operated.

Figure 18:
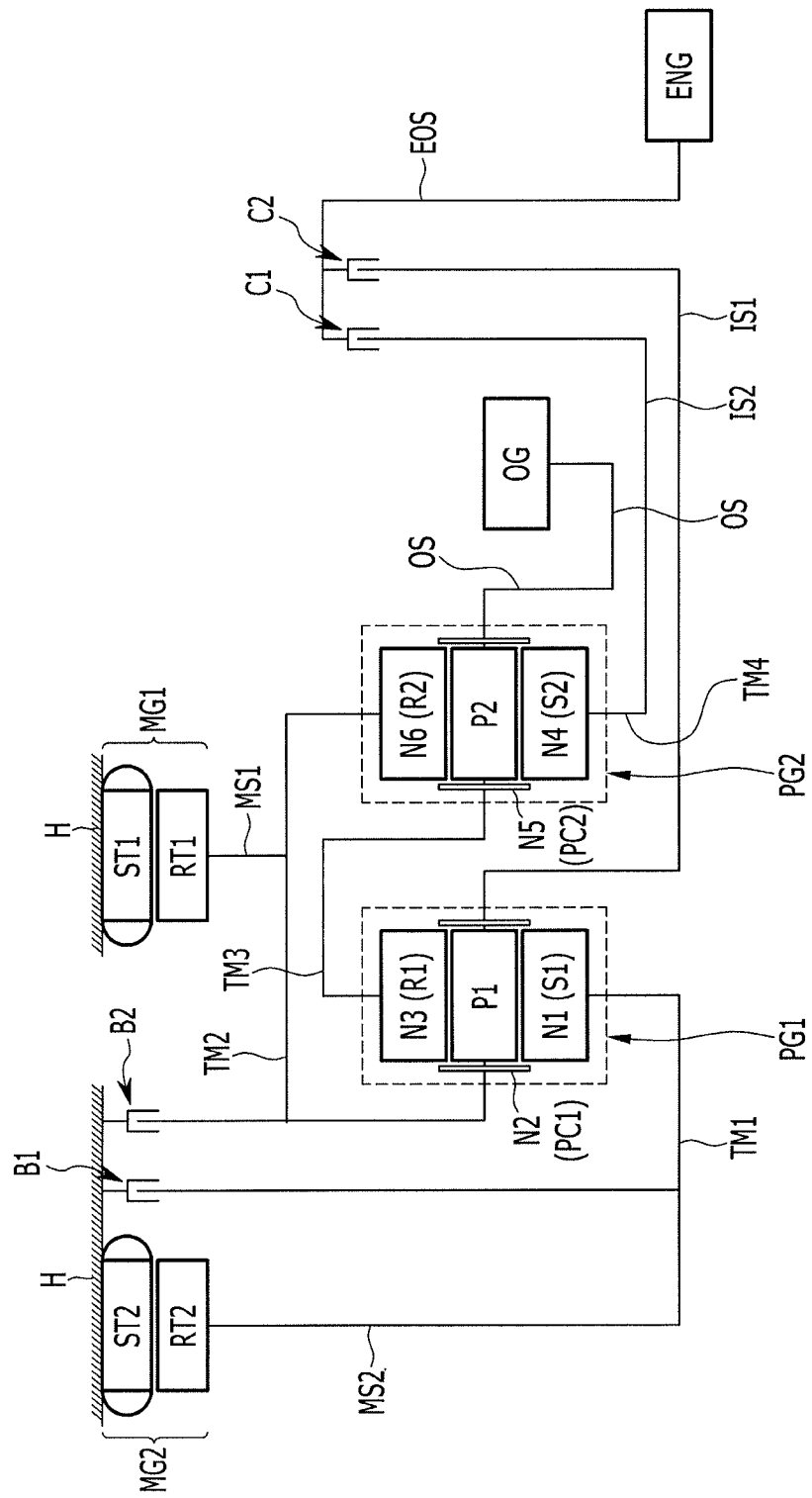
FIG. 18 is a schematic diagram of a fourth exemplary power transmission system of a vehicle according to the present invention.

FIG. 18 is a schematic diagram of a power transmission system of a vehicle according to various embodiments of the present invention. The power transmission system of the vehicle illustrated in FIG. 18 is formed by adding the second motor/generator MG 2 to the power transmission system of the vehicle illustrated in FIG. 15. The second motor/generator MG2 is fixedly connected to the first rotation shaft TM1.

Figure 20:
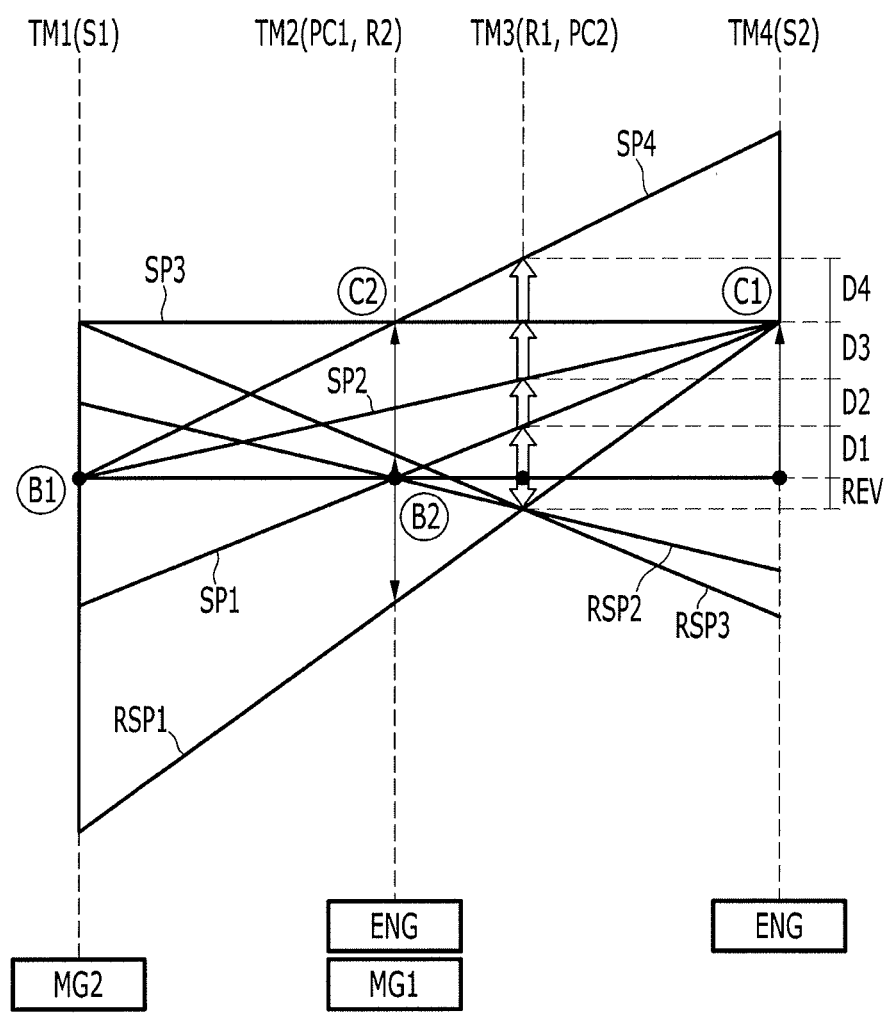
FIG. 20 is a lever diagram at each speed stage in the fourth exemplary power transmission system of the vehicle according to the present invention.

FIG. 19 is an operational chart of control elements at each speed stage applied to a power transmission system of a vehicle according to various embodiments of the present invention, and FIG. 20 is a lever diagram at fixed speed stages.

Referring to FIG. 19, the first clutch C1 and the second brake B2 are operated at the first forward speed stage 1ST.

As shown in FIG. 20, in a state that torque of the engine ENG is input to the fourth rotation shaft TM4 by operation of the first clutch C1, the second rotation shaft TM2 is operated as the fixed element by operation of the second brake B2. Therefore, the four rotation shafts form a first shift line SP1 and D1 is output through the third rotation shaft TM3.

An e-CVT can be achieved at the first forward speed stage. The e-CVT can be achieved in two ways.

In the first way, the second brake B2 is released. In this case, the rotation speed of the engine ENG can be controlled by operation of the first motor/generator MG1.

In the second way, the second brake B2 is operated. In this case, the rotation speed of the engine ENG is controlled by operation of the second motor/generator MG2.

Referring to FIG. 19, the first clutch C1 and the first brake B1 are operated at the second forward speed stage 2ND.

As shown in FIG. 20, in a state that the torque of the engine ENG is input to the fourth rotation shaft TM4 by operation of the first clutch C1, the first rotation shaft TM1 is operated as the fixed element by operation of the first brake B1. Therefore, the four rotation shafts form a second shift line SP2 and D2 is output through the third rotation shaft TM3.

The e-CVT can be achieved at the second forward speed stage. The e-CVT can be achieved in two ways.

In the first way, the first brake B1 is released. In this case, the rotation speed of the engine ENG can be controlled by operation of the first motor/generator MG1 and the second motor/generator MG2.

In the second way, the first brake B1 is operated. In this case, the rotation speed of the engine ENG can be controlled by operation of the first motor/generator.

Referring to FIG. 19, the first clutch C1 and the second clutch C2 are operated at the third forward speed stage 3RD.

As shown in FIG. 20, the torque of the engine ENG is simultaneously input to the fourth rotation shaft TM4 and the second rotation shaft TM2 by operation of the first clutch C1 and the second clutch C2. In this case, the first and second planetary gear sets PG1 and PG2 become lock-up states. Therefore, the four rotation shafts form a third shift line SP3 and D3 is output through the third rotation shaft TM3.

Since the first and second planetary gear sets PG1 and PG2 are lock-up states at the third forward speed stage, the second clutch C2 is released and the third forward speed stage can be achieved only by operation of the first and second motor/generators MG1 and MG2.

Referring to FIG. 19, the second clutch C2 and the first brake B1 are operated at the fourth forward speed stage 4TH.

As shown in FIG. 20, in a state that the torque of the engine ENG is input to the second rotation shaft TM2 by operation of the second clutch C2, the first rotation shaft TM1 is operated as the fixed element by operation of the first brake B1. Therefore, the four rotation shafts form a fourth shift line SP4 and D4 is output through the third rotation shaft TM3.

The e-CVT can be achieved at the fourth forward speed stage. The e-CVT can be achieved in two ways.

In the first way, the first brake B1 is released. In this case, the rotation speed of the engine ENG can be controlled by operation of the first and second motor/generator MG1 and MG2.

In the second way, the first brake B1 is operated. In this case, the rotation speed of the engine ENG can be controlled by operation of the first motor/generator MG1.

The reverse speed stage REV can be achieved in three ways.

In the first way, the torque of the engine ENG and the first motor/generator MG1 is used. In a state that the torque of the engine ENG is input to the fourth rotation shaft TM4 by operation of the first clutch C1, the first motor/generator MG1 is rotated inversely. In this case, the four rotation shafts form a first reverse shift line RSP1 and REV is output through the third rotation shaft TM3.

In the second way, only the torque of the second motor/generator MG2 is used. If the second rotation shaft TM2 is operated as the fixed element by operation of the second brake B2, the four rotation shafts form a second reverse shift line RSP2. Therefore, the REV is output through the third rotation shaft TM3.

In the third way, a third reverse shift line RSP3 can be formed only by operation of the first and second motor/generators MG1 and MG2. Therefore, the REV is output through the third rotation shaft TM3.

The power transmission system of a vehicle according to various embodiments of the present invention can achieve two electric vehicle modes EV1 and EV2. In a state that the second brake B2 is operated, the second motor/generator MG2 is operated at a first electric vehicle mode EV1. In a state that the first brake B1 is operated, the second motor/generator MG2 is operated, or both of the first and the second motor/generator MG1 and MG2 are operated at the first electric vehicle mode EV1. In a state that the first brake B1 is operated, the first motor/generator MG1 is operated at the second electric vehicle mode EV2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmission system of a vehicle comprising:
a first input shaft selectively connected to an engine;
a second input shaft as a hollow shaft, enclosing the first input shaft without rotational interference with the first input shaft, and selectively connected to the engine;
an output shaft outputting torque;
a first planetary gear set including first, second, and third rotation elements;
a second planetary gear set including fourth, fifth, and sixth rotation elements;
a first rotation shaft fixedly connected to the first rotation element;
a second rotation shaft fixedly connected to the second rotation element and fixedly connected to the sixth rotation element;
a third rotation shaft fixedly connected to the third rotation element, fixedly connected to the fifth rotation element, and fixedly connected to the output shaft;
a fourth rotation shaft fixedly connected to the fourth rotation element; and
a first motor/generator fixedly connected to the first rotation shaft or the second rotation shaft,
wherein the first planetary gear set is a single pinion planetary gear set, wherein a first sun gear is the first rotation element, a first planet carrier is the second rotation element, and a first ring gear is the third rotation element,
wherein the second planetary gear set is a single pinion planetary gear set, wherein a second sun gear is the fourth rotation element, a second planet carrier is the fifth rotation element, and a second ring gear is the sixth rotation element,
wherein the fourth rotation shaft is fixedly connected to the second input shaft,
wherein the second rotation shaft is fixedly connected to the first input shaft and is selectively connected to a transmission housing, and
wherein the first rotation shaft is selectively connected to the transmission housing and is fixedly connected to the first motor/generator.

2. The power transmission system of claim 1, further comprising:
a first clutch disposed between an engine output shaft and the second input shaft;
a second clutch disposed between the engine output shaft and the first input shaft;
a first brake disposed between the first rotation shaft and the transmission housing; and
a second brake disposed between the second rotation shaft and the transmission housing.

3. The power transmission system of claim 1, further comprising a second motor/generator fixedly connected to the fourth rotation shaft.

4. A power transmission system of a vehicle comprising:
an engine output shaft transmitting torque of an engine;
an output shaft outputting torque;
a first planetary gear set including first, second, and third rotation elements;
a second planetary gear set including fourth, fifth, and sixth rotation elements;
a first rotation shaft fixedly connected to the first rotation element, fixedly connected to a first motor/generator, and selectively connected to a transmission housing;
a second rotation shaft fixedly connected to the second rotation element, fixedly connected to the sixth rotation element, selectively connected to the transmission housing, and selectively connected to the engine output shaft;
a third rotation shaft fixedly connected to the third rotation element, fixedly connected to the fifth rotation element, and fixedly connected to the output shaft; and
a fourth rotation shaft fixedly connected to the fourth rotation element and selectively connected to the engine output shaft,
wherein the first planetary gear set is a single pinion planetary gear set, wherein a first sun gear is the first rotation element, a first planet carrier is the second rotation element, and a first ring gear is the third rotation element,
wherein the second planetary gear set is a single pinion planetary gear set, and
wherein a second sun gear is the fourth rotation element, a second planet carrier is the fifth rotation element, and a second ring gear is the sixth rotation element.

5. The power transmission system of claim 4, further comprising:
a first clutch selectively connecting the engine output shaft to the fourth rotation shaft;
a second clutch selectively connecting the engine output shaft to the second rotation shaft;
a first brake selectively connecting the first rotation shaft to the transmission housing; and
a second brake selectively connecting the second rotation shaft to the transmission housing.

6. The power transmission system of claim 4, further comprising a second motor/generator fixedly connected to the fourth rotation shaft.

* * * * *